May 25, 1937.    J. SQUIRES    2,081,646
METHOD OF MAKING PROPELLER BLADES
Original Filed July 5, 1933    2 Sheets-Sheet 1
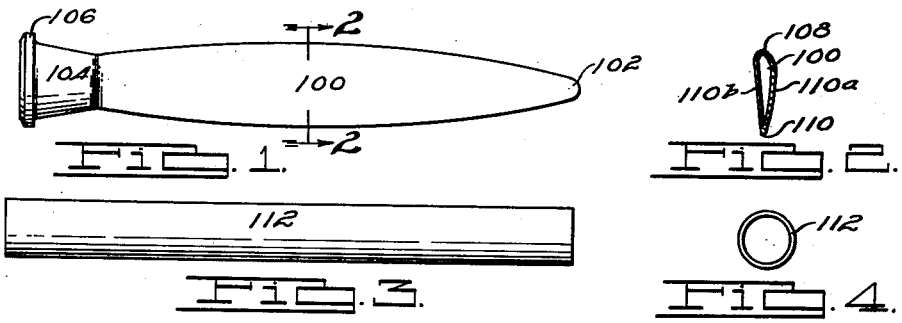
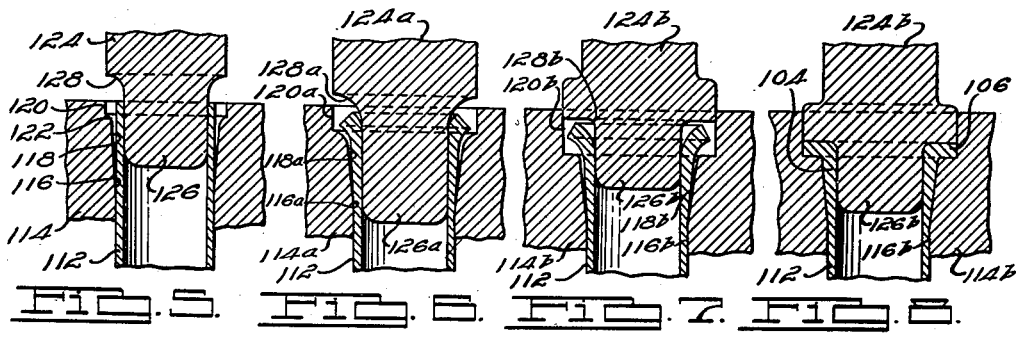
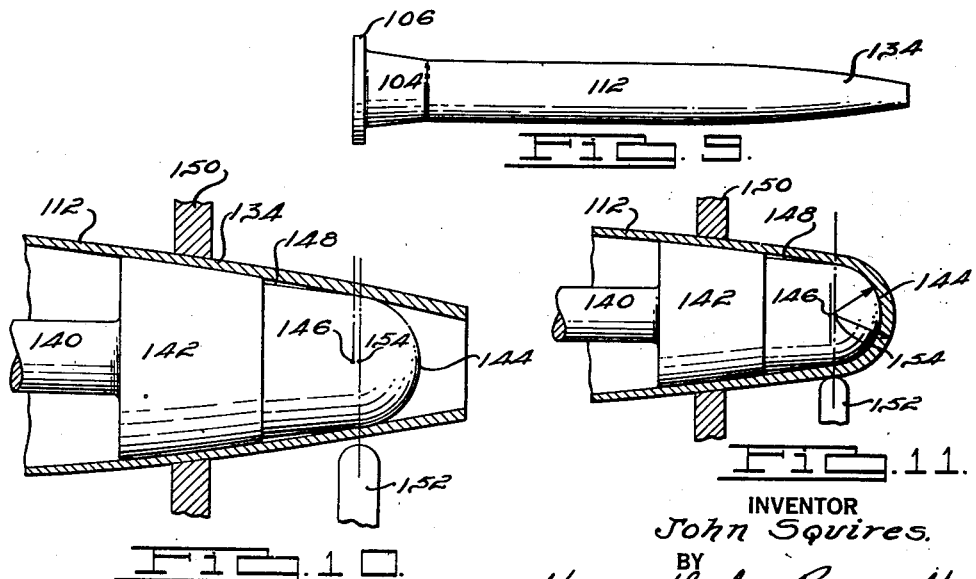
INVENTOR
John Squires.
BY
Harness, Dickey, Pierce & Hann.
ATTORNEYS.

May 25, 1937.  J. SQUIRES  2,081,646
METHOD OF MAKING PROPELLER BLADES
Original Filed July 5, 1933   2 Sheets-Sheet 2
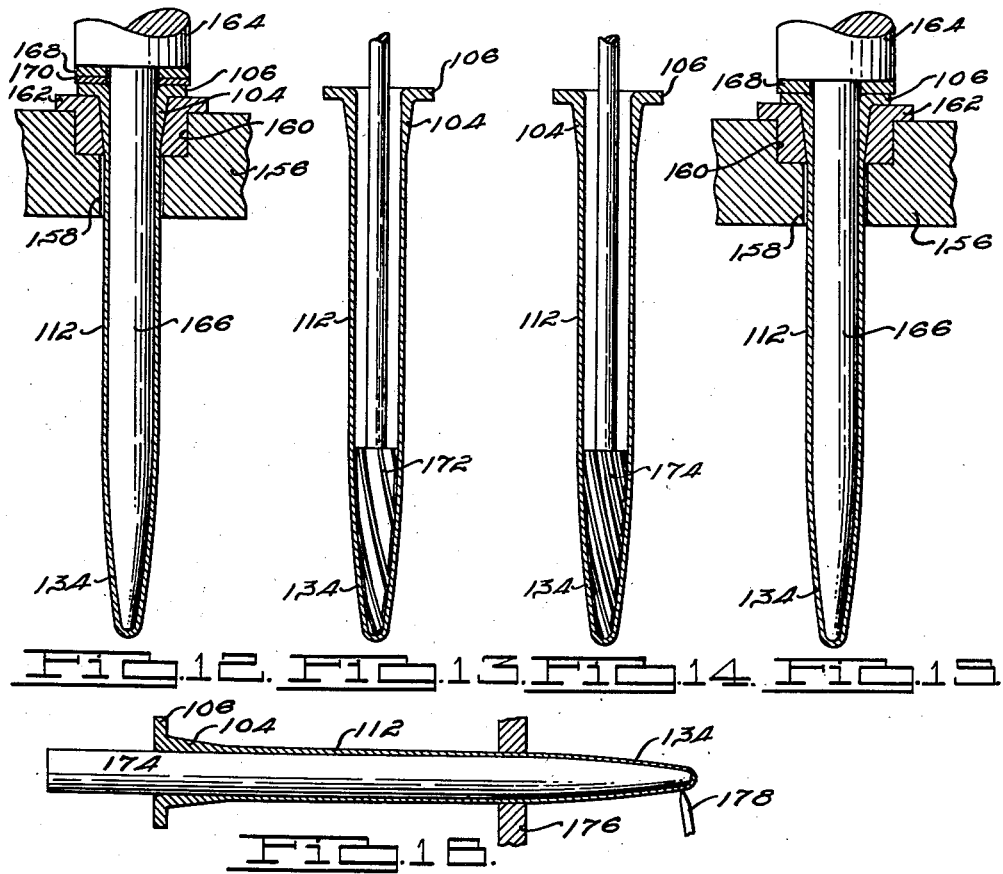
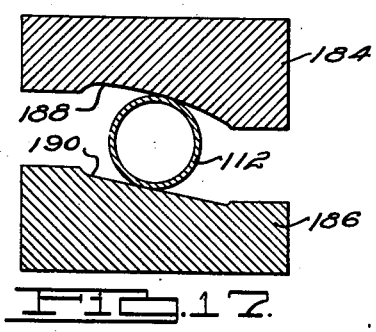
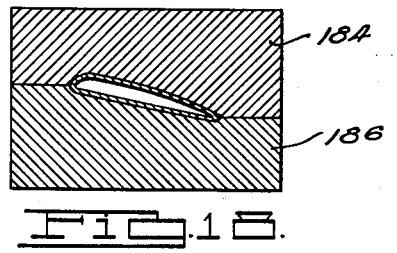
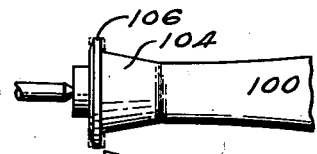
INVENTOR
John Squires.
BY
Harness, Dickey, Pierce & Hann.
ATTORNEYS.

Patented May 25, 1937

2,081,646

UNITED STATES PATENT OFFICE 2,081,646

METHOD OF MAKING PROPELLER BLADES

John Squires, Hagerstown, Md., assignor to United Aircraft Corporation, East Hartford, Conn., a corporation of Delaware Application July 5, 1933, Serial No. 679,136
Renewed November 4, 1936

22 Claims. (Cl. 29—156.8)

This invention relates to propeller blades and particularly to hollow metallic propeller blades of the type adaptable for use in connection with aircraft, the principal object being the provision of certain step or steps of operations adaptable for use in connection with the manufacture of such blades which contributes to the ease, accuracy and/or economy in manufacture of the finished product.

Objects of the present invention relate to one or more steps of operation in the formation of a hollow metallic propeller blade including working upon a tubular metallic blank to close an end thereof, and accurately predetermining the internal dimensions of the blank thus formed; working upon a tubular metallic blank to close an end thereof, and thereafter bringing both internal and external dimensions thereof into accurate conformance with a predetermined standard; working upon a tubular piece of metal to close an end thereof, and thereafter accurately predetermining at least a portion of the internal size, shape and contour of the blank thus formed by forcing into it a mandrel which will stretch at least a portion of the material of the blank beyond the elastic limit thereof; machining the inner surface of the small end of a tubular blank having an open end and a smaller closed end, and thereafter bringing the internal dimensions of the blank into conformance with a predetermined standard by forcing into it a mandrel of desired size, shape and contour; forcing a mandrel into a tubular blank having an open end and a smaller closed end so as to stretch at least a portion of the blank beyond the elastic limit of the material from which it is formed, internally machining the smaller end of the blank, and forcing into the blank a mandrel under sufficient pressure to cause portions of the blank to internally conform in size, shape and contour to the corresponding wall portions of the mandrel.

Further objects include working upon a tubular piece of metal to close an end thereof, working upon the inner and outer surfaces of the blank thus formed to bring the dimensions thereof into conformance with a predetermined standard, and then pressing the blank to blade shape; working upon a tubular metal blank having an open end and a smaller closed end to bring the dimensions thereof into conformance with a predetermined standard size, shape and contour, placing the blank upon a mandrel and removing metal from the exterior surfaces of the blank to bring the size, shape and contour of such surfaces into conformance with a predetermined standard, and then pressing the blank to blade shape; and working upon a tubular metal blank having an open end and a smaller closed end to bring its internal dimensions into conformance with a predetermined standard, including forcing a mandrel of predetermined size, shape and contour into the blank so as to cause the blank to permanently internally conform in shape, size and contour with the exterior surfaces of the mandrel, removing metal from the exterior surfaces of the blank to bring the wall thicknesses of the blank to a predetermined desired value, and then pressing the blank to blade shape.

The above being among the objects of the present invention, the same consists of certain steps of operation and/or combination of steps of operation to be hereinafter described with reference to the accompanying drawings, and then claimed, having the above and other objects in view.

In the accompanying drawings:

Fig. 1 is a side elevational view of a propeller blade.

Fig. 2 is a transverse sectional view of the blade shown in Fig. 1, taken as on the line 2—2 thereof.

Fig. 3 is a side elevational view of the cylindrical metallic blank constituting the starting point for the operations herein described for forming the blade shown in Fig. 1.

Fig. 4 is an end view of the blank shown in Fig. 3.

Figs. 5 to 8, inclusive, illustrate successive steps of operation upon one end of the blank shown in Figs. 3 and 4 to provide a securing flange thereon.

Fig. 9 is a side elevational view of the blank after the flange has been formed on one end thereof and after the opposite end thereof has been reduced in diameter to form a small end or nose portion.

Figs. 10 and 11 are enlarged fragmentary sectional views of the small end of the blank shown in Fig. 9 and illustrating the type of operations performed upon such end to close it.

Figs. 12 to 15, inclusive, are sectional views taken axially to the blank after its end has been closed in the manner illustrated in Figs. 10 and 11, and illustrating the preferred means and method of accurately sizing the blank internally.

Fig. 16 is a sectional view taken axially through the blank after its end has been closed and it has been internally sized, and illustrating a method of operating upon its exterior surfaces to bring its wall thickness to the desired dimensions.

Fig. 17 is an enlarged sectional view taken transversely to the length of the blank illustrated in Fig. 16 showing its position between suitable dies employed for pressing it to blade formation, before closing of the dies.

Fig. 18 is a view similar to Fig. 17 showing the blank pressed to blade formation.

Fig. 19 is a fragmentary side elevational view illustrating the final steps of operation upon the flanged end of the blade.

It will be understood that in the following specification and its reference to the accompanying drawings, a plurality of steps or series of steps of operation have been shown and disclosed which have been found, when combined with each other, to result in certain economies in production and desired accuracy and quality in the resultant blade produced. However, it is not to be understood that the invention, in its broader aspects is limited to the employment of all or even substantially all of the steps or series of steps of operation throughout the manufacture of a propeller blade, for many such steps or phases of operation are capable of being replaced by other steps which may or may not be the equivalent of the steps disclosed, without affecting the particular invention herein contained. Likewise, a propeller blade is shown and described consisting as a whole of various parts or elements and, while the features shown combine to make a desirable propeller, the invention is not confined to all details shown as combined, as the invention herein involved may be applicable to propellers of different formation from that illustrated, for instance, in Fig. 1 of the drawings.

Referring now to Figs. 1 and 2 of the drawings, a propeller blade of the type particularly adaptable to the practices of the present invention, is shown. This propeller blade is of hollow construction, and is preferably formed of steel and includes the main body portion 100 having a tip 102 at one end thereof and a shank portion 104 at the opposite end thereof. Although, in accordance with the broader aspects of the present invention, the particular means provided in connection with the shank portion 104 for aiding in securing the propeller blade in a hub structure (not shown) is more-or-less immaterial, a preferred form of such means is shown in Fig. 1 in the form of a single outwardly extending annular flange 106 at the root end of the shank 104. It will also be understood that the main body portion of the propeller blade is generally of airfoil section, and provided with a leading edge 108 and a trailing edge 110, and has a front or camber face 110a and a rear or flat face 110b, and that preferably the main body portion 100 is more-or-less twisted or warped over its length in order that each increment of the length thereof has substantially the same pitch as any other such increment.

The hollow type of propeller blade is preferred generally for the reason that when properly constructed, it provides maximum strength for given weight. While all phases of the invention are not confined thereto, the following description will deal solely with the preferred form and manner of making the propeller blades shown in Figs. 1 and 2. It may also be noted that although the propeller blade shown in Figs. 1 and 2 may be constructed of material other than steel, the following description will deal solely with the construction of such blade made of steel, and should it be desired to form such blades from material other than steel, those skilled in the art will readily recognize such variations or changes in the methods hereinafter described as will be necessary in such cases.

Figs. 3 and 4 show a piece of stock or blank 112 which forms the starting point for the manufacture of the blade shown in Figs. 1 and 2. This piece of stock or blank 112 is a cylindrical steel tube of suitable length and preferably of an external and internal diameter slightly larger and smaller than the respective external and internal diameters of the finished blade respectively at a point adjacent the outer end of the shank portion 104. Of course, in the broader aspects of the invention, the particular composition of the steel employed may vary in accordance with the desires of the particular designer or manufacturer but for the purpose of illustration in the present case, it will be considered of that type known as "4130-X", the composition of which is well-known to those in the industry and is disclosed, as for instance, in the S. A. E. Hand Book published by the Society of Automotive Engineers, Inc., 29 West 39th Street, New York, New York. Another composition of steel disclosed in said S. A. E. Hand Book and known as "6135" is also suitable for the blank 112, as are many other compositions therein disclosed.

Preferably, the first operations upon the blank 112 are in connection with the formation of the shank 104 and flange 106, as disclosed in Figs. 5 to 8 inclusive. Briefly stated, these operations consist of operating upon an end of the blank so as to upset the metal thereof to thicken it and simultaneously to cause the extreme end portion thereof to be belled outwardly to form the flange 106. This particular method of forming the shank 104 and flange 106 forms no part of the present invention but is more fully disclosed and claimed in my copending application for Letters Patent of the United States for improvements in Method of flanging tubular members, filed on the 11th day of March, 1931 and serially Numbered 521,796. The main advantage of the particular method of forming the flanges 106 shown lies in the fact that by its use the grain flow lines of the metal are not materially disturbed and it results in a part of maximum strength.

As illustrated in Fig. 5, a die 114 is provided having an opening 116 therethrough of such a diameter at one end as to relatively closely embrace the blank 112 when fitted therein. The opening 116 is gradually increased in diameter or flared outwardly as at 118 toward the upper face of the die 114 and at the upper face of the die 114 is enlarged as at 120, the flared portion 118 being joined to the portion 120 by a smooth but more abruptly curved portion 122. The ram 124 of the press in which this die structure is supported is provided with a main body portion of a diameter slightly smaller than the diameter of the portion 120 of the opening 116 so as to be receivable therein, and a pilot portion 126 of an external diameter such as to be relatively closely receivable within the end of the blank 112, and at the point of junction of the pilot portion 126 of the ram 124 a curved shoulder 128 is provided. One end of the blank 112 which has been suitably heated to a forging temperature is inserted into the die 114 to approximately the position indicated in Fig. 5, the blank is locked against axial movement by suitable means (not shown), the pilot 126 is inserted in the end of the tube 112, and the ram is forced home, causing the end of the tube to be upset and thickened in diameter so as to completely fill the flared portion 118 of the opening 116 and the extreme end of the tube 112 is also simultaneously bent outwardly.

The condition of the tube 112 after it has been acted upon by the dies illustrated in Fig. 5 is indicated in Fig. 6, which further illustrates the next operation and dies before the dies are closed. In Fig. 6, in which the same numerals refer to the corresponding parts of the dies described in Fig. 5, except that they bear the sub-mark "a", it will be noted that the flared portion 118a of the opening 116a is flared to a slightly greater extent than in Fig. 5, that the opening 120a is slightly larger in diameter and deeper than the opening 120. By the apparatus illustrated in Fig. 6 the end of the blank, when worked upon assumes the shape indicated in Fig. 7 which illustrates the next step of operation and in which it will be noted that again like numerals refer to like die parts in the previous figures except that they bear the sub-mark "b", and that the flared portion 118b of the opening 116b is flared outward to a greater extent than in Fig. 6, that the opening 120b is of increased diameter and depth, and that the curved portions 122b and 128b are of smaller dimensions. In Fig. 8 is illustrated the apparatus in Fig. 7 with the dies in closed position and the flange 106 and shank 104 formed in their final rough position. It will be apparent that each of the above described operations are conducted while the end of the blank being worked upon is at forging temperature and that as many of such steps may be employed as are necessary or desirable in bringing the end of the blank to the desired configuration without undesired distortion of the grain flow of the metal in such end of the blank. As before mentioned, the main purpose of this particular method of forming the flange 106 on the end of the blank by simultaneously upsetting and belling the end portion of the blank is to maintain the grain flow lines of the metal in substantially their original condition and without causing disruption thereof which would tend to weaken the structure.

The next step of operation is in connection with the inwardly tapering especially the end of the blank 112 opposite the flange 106 to form a small, nose or tip portion 134 as indicated in Fig. 9. This operation upon the blank may be conducted by one or more suitable swaging or other operations well known to those skilled in the art, and while the operation may be a cold swaging operation in whole or in part, particularly in the final stages, the blank or such end of the blank is preferably repeatedly brought to a forging temperature so as to maintain the plasticity of the metal during the operation and maintain the proper grain structure and grain flow lines of the metal. One commercial way to produce this taper is by the use of clapper dies (not shown) using several dies and gradually getting the tapered shape in several passes in the dies. While the taper is especially noticeable towards the smaller nose end of the blank, it may be tapered slightly throughout substantially its entire length. In addition, it is preferable to normalize and pickle the blank before beginning these operations, and, if necessary, one or more times during the tapering process. Also, before the final tapering operation on the small end or nose portion 134, it is preferable to normalize, pickle and straighten the blank. The normalizing treatment in the case of the particular steel specified as by way of example may be to raise the temperature of the blank to 1625–1675° F., in a suitable furnace, holding the temperature at this value for approximately twenty minutes, and then shutting off the heat and letting the blank cool in the furnace until its temperature falls below 1200° F. when it may be removed to cool in the air or for further operations about to be described.

The next operation upon the blank 112 deals with the closing of the nose or small end of the blank and this is preferably accomplished by the use of a spinning operation such as is indicated more or less diagrammatically in Figs. 10 and 11. In carrying out this spinning operation the blank 112 is placed upon a mandrel 140 which has an end portion 142 which accurately fits and is properly centered in the end portion of the nose 134 of the blank 112. The extreme end of the portion 142 is rounded as at 144 into conformance with that desired for the interior surface of the end of the blank. Preferably, the end surface 144 is partly spherical in shape with a center located as at 146. After the mandrel 140 has been thus formed it is preferable to cut down or relieve the end 142 in diameter towards the tip. This relief, which is indicated as at 148, may begin a short distance back from the tip and need not be very deep. The purpose of this relief is to keep the ends of the blank from actual contact with the mandrel over the length of the relief. It has been found that when the blank is in actual contact with the mandrel it is difficult to keep the end of the blank hot enough to be conveniently and properly worked. By cutting down or relieving the mandrel as shown the blank is kept out of contact therewith over such area and the heat is not so readily conducted away from the tip of the blank which is to be closed. The mandrel 140 with the blank 112 thereon is then mounted in a suitable lathe or other turning machine (not shown) in which the small end of the blank is preferably supported as by a steady rest 150, care being taken in adjusting it to allow any subsequent expansion of the blank which may occur due to the heating of the tip thereof for the spinning operation. In operation the mandrel 140 with the blank 112 thereon are rotated in the lathe and a flame from a torch (not shown) is played upon the end portion of the blank 112 to bring it to a suitable condition of plasticity, as, for example, that indicated by a bright red coloring of the metal at the nose or tip. A spinning tool, such as 152, pivotally supported for movement about a line perpendicular to and intersecting the axial line of a blank 112, as at 154, is then positioned with its pivotal axis 154 outwardly spaced towards the tip of the blank from the center 146 of the end 144 and is then swung around so as to at first contact only with the outer end portion of the tip of the nose 134, thus working such portion inwardly, and on successive passes the pivot axis 154 of the tool 152 is gradually moved towards the center 146 until in the latter stages of movement of the spinning tool the metal at the extremity of the blank is brought together on the axis of the blank and tends to internally conform to the shape of the surface 144 as indicated in Fig. 11. Preferably the pivotal axis 154 of the spinning tool 152 is not moved inwardly as far as the center 146 of the end 144, this being done in order to provide the extreme tip portion of the nose 134 with a wall thickness of slightly greater dimensions than the wall thickness of the nose 134 immediately adjacent thereto. It is understood, of course, that the flame from the torch continues to play against the tip of the blank during these operations and may continually keep such end at such temperature that when the end is finally closed, as indicated in Fig. 11, the metal of the tip may weld itself together at the line or point of closure.

The next operation is to normalize the newly formed tip portion of the blade to restore its proper grain structure and this step may be conveniently accomplished by heating the tip end of the blank to about 1625° F. to 1675° F., in case the particular metal specified, and allowing it to cool in a sand box to below 1200° F.

As will be apparent to those skilled in the art, the operation of tapering the end of the blank 112 to form the nose portion 134 as illustrated in Fig. 9 may result in a thickening of the wall of this portion of the blank in somewhat the manner indicated in Fig. 10. Such operation upon the end of the blank to form the nose portion 134, due to the crowding in of the metal thereof, may cause folds, wrinkles or other imperfections to develop upon the inner surface of the nose portion 134 of the blank 112.

After the tapered end portion 134 has been formed and the tip closed, the internal size, shape and contour of the blank 112 is approximately, but of slightly smaller dimensions than that desired in the completed blank immediately prior to pressing it to blade formation, and the following steps of operation upon the blank are preferably those dealing with the bringing of the internal size, shape and contour of the blank into exact conformance with that desired in the completed blank, and the preferred method of accomplishing this result will now be explained in detail.

The bed 156 of a suitable power press or bulldozer is provided with an opening 158 therein. One end of the opening 158 is enlarged as at 160 in order to receive the die insert 162 therein. The die insert 162 is provided with a central opening concentric with the opening 158 and formed complementary to the tapered shoulder 104 of the blank 112 and the blank 112 is inserted therein in the manner illustrated in Fig. 12 with the face of the flange 106 resting upon the face of the insert 162 so as to take the force of the stretching operation. The ram 164 of the power press has secured thereto a mandrel 166, the size, shape and contour of which conforms exactly to the predetermined internal size, shape and contour of the desired finished blank and which, accordingly, is slightly larger than the interior size, shape and contour of the blank 112 in the condition in which it is represented in Figs. 9, 10 and 11. The mandrel 166 is preferably tapered over the main body portion thereof a slight amount to give greater ease in inserting and removing it from the blank. A ring or spacing washer 168 is preferably placed about the mandrel 166 against the shoulder formed at the junction between the mandrel 166 and ram 164 for the purpose of relieving this shoulder of any wear that might otherwise occur in subsequent operations and for accurately controlling the amount of penetration of the mandrel 166 into the blank 112. In addition, for use in connection with the first operation of the mandrel 166 upon the blank 112, a supplementary ring or spacing washer 170 is employed in conjunction with the ring 168. The length of the mandrel 166 is preferably such that when the ring 168 contacts with the surface of the flange 106 the mandrel 166 will have been forced fully home in the blank 112. Consequently, in the initial operation of the mandrel 166 upon the blank 112, the ring 170, which for blank forming blades of usual sizes is preferably in the neighborhood of ½ inch thick, will permit the mandrel to be forced into the blank only to within this distance of its final position.

Before any attempt is made to force the mandrel 166 into the blank 112 by the power press, the exterior of the mandrel 166 is preferably coated with white lead and graphite or other suitable lubricant, and then the mandrel 166 is forced into the blank 112 to the position indicated in Fig. 12. In forcing the mandrel 166 into the blank 112, as illustrated in Fig. 12, which operation is preferably conducted while the blank 112 is cold, that is, not artificially heated, the mandrel causes the blank to be stretched until its internal size, shape and contour are forced to conform to the external size, shape and contour of the mandrel, and ordinarily this causes the blank to be stretched both radially and axially. It may be noted that, because of the reduced dimensions of the nose portion 134 of the blank and because of the increased wall thickness of this portion produced during the nose forming operation, ordinarily very little stretching of the nose portion 134 will be caused by the mandrel 166 and, consequently, when once the nose portion of the mandrel 166 contacts with the nose portion 134 of the blank, further inward movement of the mandrel 166 will tend to stretch the blank longitudinally or axially. Under such circumstance should, for any reason, any portion of the interior wall surface of the body portion of the blank 112 be not in firm contact with the outer surface of the mandrel 166, the subsequent axial stretching of the blank 112 as the mandrel 166 is forced in will tend to cause a radial contraction of the blank which, in most cases, will bring substantially all portions of the interior wall into contact with the outer surface of the mandrel, and consequently remedy this undesired condition. It may also be noted that inasmuch as this operation is designed to initially and permanently size the interior of the blank, the material of the blank must ordinarily be stretched beyond its elastic limit by the movement of the mandrel so that the effect of such stretching will be permanent.

The next operations are concerned with bringing the interior size, shape and contour of the nose portion 134 of the blank 112 into accurate conformance with a predetermined standard. It has been explained above that ordinarily this is impractical by the use of the mandrel 166 alone for the reason that the nose portion 134 is of reduced diameter and of increased wall thickness, but it will be apparent that in any case the mandrel 166 would not in all cases remove any folds or wrinkles on the interior surface of the nose portion 134 that may have appeared during the nose forming operation referred to in connection with Fig. 9. Consequently, in order to be absolutely sure that no folds, wrinkles or other defects remain and that the interior size, shape and contour of the nose portion 134 will accurately conform to a predetermined standard, it is subjected to one or more reaming operations in which metal is actually removed from the interior surface of the nose portion 134.

Such removal of metal from the interior surface of the nose portion 134 is conveniently accomplished by the employment of formed reamers, such as the reamer 172 illustrated in Fig. 13 and the reamer 174 illustrated in Fig. 14, the reamer 172 being illustrated as a roughing reamer and the reamer 174 being illustrated as a finishing reamer, but it will be apparent that as many reamers or other tools of this or other types may be employed for completing the operation as is found to be necessary or desirable, at least the final reamer being shaped and operated to produce the exact shape and size finally desired in the nose portion of the blank.

By these operations the interior size, shape and contour of the nose portion 134 are brought into accurate conformance with the predetermined standard desired in the finished and completed blank and corresponding to the size of the tip of the mandrel 166. The blank 112 is then replaced in the press apparatus illustrated in Fig. 12, omitting the collar 170 as illustrated in Fig. 15, in unheated condition, and then the mandrel 166 is again forced home in the blank 112. With the ring 170 omitted the mandrel 166 may be forced completely home in the blank. The tip of the mandrel seats on the correspondingly formed interior of the nose portion 134 of the blank 112 and as it is thrust in, operates on the main body of the blank between the nose portion and the flange 106 which is held immovable by the block 162. This operation causes sufficient pressing of the blank in either a radial or axial direction, or both, to bring the entire interior surface of the blank into contact with the surface of the mandrel and so into the size, shape and form desired in the finished blank and as governed by the exterior size, shape and contour of the mandrel 166. Since the stretching is beyond the elastic limit of the metal, the final form will be substantially retained. It will, of course, be understood that this operation, like the operation illustrated in Fig. 12, is preferably accomplished while the surface of the mandrel 166 is well lubricated as, for instance, with a mixture of white lead and graphite. Because of the irregular form of the original tube it may be that parts of it will not need stretching to assume the size of the corresponding portion of the mandrel, but the mandrel is forced into the blank with sufficient pressure to stretch beyond the elastic limits the metal of those portions which are deformed with the result that after the mandrel is removed the interior of the blank remains substantially the size of the mandrel throughout its entire area. After this operation, the tube 112 is preferably again subjected to a normalizing treatment and again pickled.

The blank thus produced is then inspected for the purpose of determining whether it will be capable, upon further operation, to produce a perfect completed blank. This inspection may involve the checking of all external dimensions of the blank and rejecting all of such blanks as do not have enough metal on their exterior surfaces to properly clean up when the blank is externally machined to size. Enough metal being assured on the exterior surfaces of the blank for such purposes, the interior surface of the blank is then thoroughly cleaned and visually inspected and all blanks having obvious defects internally thereof, such as holes, seams, folds or reamer marks making them unfit for use, are then rejected. In the absence of such defects the blank is then inspected to insure that its interior size, shape and contour will sufficiently closely conform to the predetermined standard desired to be acceptable for further operations. This being assured the blank is then ready for the next operation which is illustrated in Fig. 16.

Referring now to Fig. 16, the blank 112 is next mounted upon a mandrel 174 which accurately fits the interior surfaces of the blank 112 and the mandrel 174 with the blank 112 firmly mounted thereon is then placed in a lathe or other suitable turning machine so as to be capable of being rotated therein about the axis of the mandrel 174. Preferably the outer or nose portion 134 of the blank 112 is supported in the lathe by any suitable means which may, for instance, be a steady rest such as 176, in order that its position may be accurately maintained during the turning operation. A suitable tool such as 178 is then employed for removing metal from the exterior surfaces of the blank in concentric relation with the axis of the mandrel 174, the tool 178 being suitably guided, by means not shown, so as to maintain its position in predetermined relation with respect to the exterior surface of the mandrel 174 and consequently with predetermined relation with respect to the interior surfaces of the blank 112 so as to enable the desired wall thickness of the blank 112 to be obtained. Preferably the tool 178 is so guided relative to the surface of the mandrel 174 that the wall thickness of the blank 112 tapers from a minimum adjacent the extreme tip thereof to a maximum adjacent the shank portion 104, this being for the purpose of obtaining an ultimate blade of minimum weight and maximum strength for a given weight. Preferably the extreme tip portion of the blank 112 is turned so as to provide a slight increase in wall thickness as compared to that immediately adjacent thereto as a precautionary measure for preventing such extreme tip portion from opening up during the subsequent pressing operation.

During the turning operation illustrated in Fig. 16 the shank portion 104 of the blank 112 may be machined substantially to size and the flange 106 rough machined, leaving enough stock particularly on opposite faces thereof to permit correction of the blade balance in a later operation.

After the blank 112 has been machined as described in connection with Fig. 16, the mandrel 174 is removed and the blank thus formed is pressed to blade shape. This pressing operation is accomplished in the manner suggested in Figs. 17 and 18 by the employment of opposed and relatively movable die sections 184 and 186 having cooperating die depressions 188 and 190 formed in their opposed faces. In operation, the die sections 184 and 186 are separated, the blank 112 is inserted between the depressions 188 and 190, as illustrated in Fig. 17, and then the die sections 184 and 186 are brought together, as illustrated in Fig. 18, and preferably while the interior of the blank 112 is maintained under the expansion pressure of a suitable gaseous substance maintained under a pressure sufficient to insure complete contact between the outer surface of the blank 112 and the surfaces of the depressions 188 and 190, but not sufficiently high to endanger stretching or rupturing of the walls of the blank 112. Preferably this operation is accomplished while the blank 112 is at a forging temperature, although under certain circumstances it may be performed while the blank is in unheated condition.

It will of course be understood that the parting line between the die sections 184 and 186 and the depressions 188 and 190 are twisted or warped over the length of the dies so as to impart to the finished blade the desired pitch, and preferably such that the pitch is uniform from one end of the blade to the other thereof. It is also to be noted that the combined perimetrical dimensions of the depressions 188 and 190 taken in a plane normal to the length of the dies at any particular point of length thereof is preferably substantially exactly equal to the perimetrical dimensions of the blank 112 at the same point when the blank is positioned therein. This latter feature insures that the exterior surfaces of the blank 112 will substantially exactly fit all corresponding surfaces of the depressions 188 and 190 when the dies are closed, as illustrated in Fig. 18, and that during the pressing operation the material of the blank 112 will simply be bent to shape without any material expansion or inward crowding thereof.

After the operations described in connection with Figs. 17 and 18, it will be apparent that the blank has assumed the blade formation indicated in Figs. 1 and 2 with the exception that it remains to complete the final form of the flange 106. Before the flange 106 is finally brought to completed dimensions the blade thus formed is preferably mounted in a suitable balancing apparatus as for instance of the type shown and described in my co-pending application for Letters Patent of the United States for improvements in Method of balancing propeller blades, filed on the 19th day of January, 1931, and serially numbered 509,673. By the use of the apparatus there disclosed means are provided whereby the desired location of either one or the other of the end surfaces of the flange 106 may be accurately predetermined with respect to the center of mass of the blade 100, and when once the desired location of such surface is predetermined by such apparatus the blade 100 may be mounted in a lathe or other suitable turning machine and by means of a suitable tool such as 194 illustrated in Fig. 19, or other suitable means, the flange 106 may be brought to its final dimensions and predetermined location.

The blade thus formed may, if desired, be subjected to further suitable finishing, corrosion resisting, or final minute balancing operations desired to bring it into the desired final condition.

Formal changes may be made in the specific embodiment of the invention described without departing from the spirit or substance of the broad invention, the scope of which is commensurate with the appended claims.

I claim:

1. The method of forming a propeller blade blank including forming a tubular blank closed at one end, and internally formed to predetermined dimensions, placing said tube over a mandrel externally conforming to the interior of said tube, and then machining the exterior of said tube in a predetermined and constantly varying relation with respect to the exterior surface of said mandrel whereby to impart a wall thickness to said blank varying from one end thereof to the other.

2. The method of forming a propeller blade blank including forming a tube closed at one end, expanding said tube to predetermined internal dimensions, and then placing said tube on a mandrel and machining the exterior of said tube in predetermined conformance with the surface of said mandrel.

3. The method of forming a propeller blade blank including forming a tube closed at one end, expanding said tube to predetermined internal dimensions, and then placing said tube on a mandrel and employing said mandrel as a locating surface while machining the exterior of said tube.

4. The method of forming a propeller blade blank including providing a metal tube, closing one end of said tube, sizing the interior of said tube by means of a mandrel and then machining the exterior of said tube while supported on said mandrel and in predetermined relation with respect to the surface of said mandrel.

5. The method of forming a propeller blade blank including forming a tube closed at one end, expanding said tube to predetermined internal dimensions, placing said tube on a mandrel conforming exteriorly to the interior of said tube, and then machining the exterior of said tube by means of a tool maintained in predetermined relation with respect to the surface of said mandrel.

6. The method of forming a propeller blade blank including providing a cylindrical tube, modifying the same into a tapered formation, closing one end thereof, sizing the interior by means of a mandrel, and then machining the exterior of said tube while supported on a mandrel and in a predetermined relation with respect to the exterior of the last mentioned mandrel.

7. The method of forming a propeller blade blank including taking a cylindrical tube and varying its cross-sectional dimensions between its ends, closing one end of said tube, upsetting the opposite end of said tube to form a flange, expanding said tube to predetermined internal dimensions and then placing said tube on a mandrel conforming externally to the interior of said tube and machining the exterior of said tube in a predetermined relation to the exterior of said mandrel.

8. The method of forming a propeller blade including forming a tubular blank closed at one end and internally formed to predetermined dimensions, placing said tube over a mandrel externally conforming to the interior of said tube, then machining the exterior of said tube in a predetermined relation with respect to the exterior surface of said mandrel, and then modifying the cross-sectional shape of said tube into the desired airfoil section.

9. The method of forming a propeller blade including forming a tube closed at one end, expanding said tube to predetermined internal dimensions, then placing said tube on a mandrel and machining the exterior of said tube in predetermined conformance with the surface of said mandrel, and then modifying the cross-sectional shape of said tube into the desired airfoil section.

10. The method of forming a propeller blade including forming a tube closed at one end, expanding said tube to predetermined internal dimensions, then placing said tube on a mandrel and employing said mandrel as a locating surface while machining the exterior of said tube, and then modifying the cross-sectional shape of said tube into the desired airfoil section.

11. The method of forming a propeller blade including providing a metal tube, closing one end of said tube, sizing the interior of said tube by means of a mandrel, then machining the exterior of said tube while supported on said mandrel and in predetermined relation with respect to the surface of said mandrel and then modifying the cross-sectional shape of said tube into the desired airfoil section.

12. The method of forming a propeller blade including forming a tube closed at one end, expanding said tube to predetermined internal dimensions, placing said tube on a mandrel conforming exteriorly to the interior of said tube, then machining the exterior of said tube by means of a tool maintained in predetermined relation with respect to the surface of said mandrel, and then modifying the cross-sectional shape of said tube into the desired airfoil section.

13. The method of forming a propeller blade including providing a cylindrical tube, modifying the same into a tapered formation, closing one end thereof, sizing the interior by means of a mandrel, then machining the exterior of said tube while supported on a mandrel and in a predetermined relation with respect to the exterior of the last mentioned mandrel, and then modifying the cross-sectional shape of said tube into the desired airfoil section.

14. The method of forming a propeller blade including taking a cylindrical tube and varying its cross-sectional dimensions between its ends, closing one end of said tube, upsetting the opposite end of said tube to form a flange, expanding said tube to predetermined internal dimensions, then placing said tube on a mandrel conforming externally to the interior of said tube and machining the exterior of said tube in a predetermined relation to the exterior of said mandrel, and then modifying the cross-sectional shape of said tube into the desired airfoil section.

15. The method of forming a propeller blade blank and blade including forming a tubular blank one end of which is smaller than the other thereof and is closed, inserting a mandrel externally conforming to the interior size, shape and contour of said blank into said blank, machining the exterior of said blank in predetermined relation with respect to the exterior surface of said mandrel, and pressing said blank to blade shape.

16. The method of forming a propeller blade blank and blade including working a cylindrical metallic tube to make one end thereof smaller than the opposite end thereof and closing said smaller end, forcing a mandrel into said blank whereby to stretch at least a portion of said blank beyond the elastic limit of the material from which it is made and permanently distort it so as to bring the interior size, shape and contour of said portion into accordance with a predetermined standard, machining the exterior surfaces of the blank in predetermined conformance to the interior surfaces thereof and modifying the cross-sectional shape of said blank to that desired in the finished blade.

17. The method of forming a propeller blade blank including providing a metallic blank of circular cross section having one end thereof closed and smaller than the opposite end thereof, forcing into said blank a mandrel having an external surface conforming in size, shape and contour with a predetermined standard whereby to radially expand the material of said blank beyond the elastic limit thereof and thereby permanently predetermine the size, shape and contour of the interior surface of said blank, and then machining the exterior surface of said blank in predetermined relation with respect to the interior surface thereof.

18. In the formation of a hollow metal propeller blade, the steps of forming an elongated hollow metal blank of generally circular cross section, one end of which is closed and smaller than the other end thereof, operating upon the interior of said blank to bring its internal dimensions into accurate conformance with a predetermined size, shape and contour, then removing material from the exterior of said blank to bring the wall thickness thereof into accurate conformance with a predetermined wall thickness, and then pressing said blank to the desired blade shape, between dies.

19. The method of forming a propeller blade blank and blade including working a cylindrical metallic tube to make one end thereof smaller than the opposite end thereof and closing said smaller end, forcing a mandrel into said blank and against said closed end and applying pressure against said closed end whereby to permanently stretch said blank longitudinally and insuring the walls of said blank being drawn into contact with the surface of said mandrel whereby to cause the interior surfaces of said blank to be brought into permanent conformance with the size, shape and contour of the exterior of said mandrel, machining the exterior surfaces of said blank in predetermined conformance to the interior surfaces thereof, and modifying the cross-sectional shape of said blank to that desired in the finished blade.

20. The method of forming a propeller blade blank and blade including first thickening one end of a cylindrical metallic tube without greatly reducing the interior dimensions of such end and displacing a portion of such thickened end outwardly to form a flange, then working said tube to bring the end thereof opposite said flange into inwardly tapered formation to provide a small end, then closing said small end, supporting said tube by the flanged end thereof and forcing a mandrel into it whereby to cause at least a portion of the tube to be stretched beyond the elastic limit of its material, interiorly machining at least a portion of said tube, the reamer being formed to substantially the exact size, shape and contour desired for the internal surfaces of said small end, then supporting said tube by said flanged end and forcing a mandrel into it against the closed end thereof and stretching the material thereof sufficiently to cause said tube to interiorly conform in size, shape and contour with the external surfaces of such mandrel, machining the exterior surfaces of the tube to make its wall thickness conform to a predetermined standard and varying from one end thereof toward the other end thereof, heating said tube above the critical temperature of the material from which it is formed, placing said tube between dies having matching depressions therein cooperable to simulate the size, shape and contour of the desired finished product, the perimetrical dimensions of the die depressions as measured at substantially any point in the length thereof and in a plane perpendicular to the longitudinal axis of the depressions corresponding substantially exactly to the corresponding perimetrical dimensions of said tube, and then bringing said dies together about said tube to form it to blade shape.

21. The method of forming a propeller blade blank and blade including working upon one end of a hollow metallic tube by successive operations to simultaneously thicken said end and flare a portion only thereof outwardly to form a terminal flange having the flow lines of the metal thereof remaining in parallel and unbroken relationship with respect to each other, working said tube to bring the opposite end thereof into inwardly tapered relationship to provide a small end, closing said small end, forcing into said tube a mandrel of predetermined size, shape and contour whereby to stretch at least a portion of the material of said tube beyond its elastic limit and causing said tube to interiorly conform in size, shape and contour to the exterior size, shape and contour of said mandrel, interiorly machining the small end of said blank, re-sizing said blank by a mandrel, removing metal from the exterior surfaces of said tube to bring the wall thickness thereof into conformance with a predetermined standard, and then modifying the cross sectional shape thereof to that desired in the final product.

22. The method of forming a hollow propeller blade which comprises forming a tubular blank closed at one end, thereafter expanding the tube to increase the circumferential dimensions of the tube to conform to the circumferential dimensions of the blade to be formed, and then employing external and internal pressure to transform the resultant work-piece into the shape desired to be given the finished blade.

JOHN SQUIRES.